US011870173B2

(12) United States Patent
Uchida

(10) Patent No.: US 11,870,173 B2
(45) Date of Patent: Jan. 9, 2024

(54) CONNECTOR

(71) Applicant: Sumitomo Wiring Systems, Ltd., Mie (JP)

(72) Inventor: Masashi Uchida, Mie (JP)

(73) Assignee: SUMITOMO WIRING SYSTEMS, LTD.

( * ) Notice: Subject to any disclaimer, the term of this patent is extended or adjusted under 35 U.S.C. 154(b) by 1069 days.

(21) Appl. No.: 16/610,075

(22) PCT Filed: Apr. 20, 2018

(86) PCT No.: PCT/JP2018/016235

§ 371 (c)(1),
(2) Date: Oct. 31, 2019

(87) PCT Pub. No.: WO2018/207588

PCT Pub. Date: Nov. 15, 2018

(65) Prior Publication Data

US 2023/0118867 A1 Apr. 20, 2023

(30) Foreign Application Priority Data

May 11, 2017 (JP) ................................ 2017-094390

(51) Int. Cl.
*H01R 13/04* (2006.01)
*H01R 13/405* (2006.01)
(Continued)

(52) U.S. Cl.
CPC ........... *H01R 13/04* (2013.01); *H01R 13/405* (2013.01); *H01R 13/639* (2013.01); *H01R 4/20* (2013.01); *H01R 2101/00* (2013.01)

(58) Field of Classification Search
CPC ... H01R 13/04; H01R 13/4367; H01R 13/405
See application file for complete search history.

(56) References Cited

U.S. PATENT DOCUMENTS 4,284,320 A * 8/1981 Nix ...................... H01R 13/436
439/752
4,973,268 A * 11/1990 Smith ................ H01R 13/5213
439/948
(Continued)

FOREIGN PATENT DOCUMENTS

JP 50-018995 3/1975
JP 2000-150040 5/2000
(Continued)

OTHER PUBLICATIONS

International Search Report dated Jul. 10, 2018.

*Primary Examiner* — Neil Abrams
(74) *Attorney, Agent, or Firm* — Gerald E. Hespos; Michael J. Porco

(57) ABSTRACT

A connector includes a male terminal (10) having a tubular terminal contact (20) open in a front-rear direction. A resin molded portion (50) is molded to the terminal contact (20). A wire (W) is pulled out rearward from the male terminal (10), and a sleeve (60) covers a core (W1) exposed in front of the wire (W). The resin molded portion (50) includes a shaft (51) inside the terminal contact (20), an insulating portion (52) projecting forward from a front of the shaft (51), a flange (53) protruding radially outward from a rear end of the shaft (51), and two locking portions (57) on a periphery of the flange (53). The flange (53) enters a concavity (64) of the sleeve (60) from one side, and two locked portions (65) provided on an inner wall of the concavity (64) lock the locking portions (57) from the other side.

3 Claims, 11 Drawing Sheets

(51) Int. Cl.

| | |
|---|---|
| ***H01R 13/639*** | (2006.01) |
| *H01R 4/20* | (2006.01) |
| *H01R 101/00* | (2006.01) |

(56) References Cited

U.S. PATENT DOCUMENTS

| | | | | |
|---|---|---|---|---|
| 6,113,436 | A * | 9/2000 | Kuwahara | H01R 13/44 439/693 |
| 6,146,211 | A * | 11/2000 | Okamoto | H01R 13/44 439/825 |
| 6,494,740 | B1 * | 12/2002 | Murakami | H01R 13/5208 439/275 |
| 8,430,696 | B2 * | 4/2013 | Matsumoto | H01R 13/521 439/271 |
| 9,160,097 | B2 * | 10/2015 | Mori | H01R 13/521 |
| 9,281,606 | B2 * | 3/2016 | Mori | H01R 13/516 |
| 9,472,889 | B2 * | 10/2016 | Uchida | H01R 13/5205 |
| 9,490,567 | B2 * | 11/2016 | Hirakawa | H01R 4/184 |
| 9,548,556 | B2 * | 1/2017 | Uchida | H01R 13/5205 |
| 9,614,305 | B2 * | 4/2017 | Uchida | H01R 4/184 |
| 9,647,370 | B2 * | 5/2017 | Uchida | H01R 13/426 |
| 10,181,676 | B2 * | 1/2019 | Nishida | H01R 13/405 |
| 10,804,623 | B2 * | 10/2020 | Minamino | H01R 4/4881 |
| 11,133,636 | B2 * | 9/2021 | Bossuyt | H01R 4/70 |
| 11,342,706 | B2 * | 5/2022 | Takagi | H01R 13/5205 |
| 2013/0052864 | A1 * | 2/2013 | Kataoka | H01R 13/5208 277/650 |
| 2015/0200481 | A1 | 7/2015 | Fukushima et al. | |
| 2015/0229054 | A1 | 8/2015 | Fukushima et al. | |
| 2015/0333434 | A1 * | 11/2015 | Duquesne | H01R 13/5205 439/587 |
| 2016/0126657 | A1 | 5/2016 | Hirakawa et al. | |
| 2016/0294097 | A1 | 10/2016 | Uchida | |
| 2019/0334293 | A1 * | 10/2019 | Iwami | B60L 53/16 |

FOREIGN PATENT DOCUMENTS

| | | |
|---|---|---|
| JP | 2014-063687 | 4/2014 |
| JP | 2014-072169 | 4/2014 |
| JP | 2016-091788 | 5/2016 |
| JP | 2016-197542 | 11/2016 |
| JP | 2016-207537 | 12/2016 |

* cited by examiner

CONNECTOR

BACKGROUND

Field of the Invention

This specification relates to a connector.

Related Art

Publication of Japanese Patent No. 5965265 discloses a male terminal having a resin cap mounted on the tip of a terminal body. This male terminal includes a tubular terminal contact, a diameter enlarged portion rearward of the terminal contact portion, and an insulating member having a tip insulating portion with an insulating property. The tip insulating portion projects forward from the tip of the terminal contact portion. The insulating member includes a penetrating rod penetrating through a rod through hole of the terminal contact portion and is formed with a retaining portion by deforming a rear end part of the penetrating rod portion by thermal welding and causing the rear part of the penetrating rod to bulge radially in conformity with the shape of the enlarged diameter portion. The retaining portion has a larger diameter than the rod through hole, and the insulating member is fixed to the terminal contact portion by locking the retaining portion to the enlarged diameter portion from behind.

An operation of inserting the insulating member into the rod through hole of the terminal contact portion must be performed separately from thermally welding the insulating member with the above-described male terminal. Thus, a manufacturing time becomes longer. For thermal welding, resin can be melted in a shorter time and an operation can be completed in a shorter time as a melting temperature of the resin becomes lower. However, if the melting temperature of the resin becomes lower, the retaining portion is deformed more easily at a low temperature. Therefore a holding force of the insulating member for holding the terminal contact portion is reduced and heat resistance is reduced.

SUMMARY

This specification relates to a connector with a male terminal including a terminal contact portion having a hollow tubular shape and open in a front-rear direction. A resin molded portion is molded integrally to the terminal contact portion. A wire is pulled out rearward from the male terminal, and a sleeve is mounted to cover a core exposed in a front end part of the wire. The resin molded portion includes a shaft filled inside the terminal contact portion, an insulating portion projecting forward from a front end of the shaft and a flange protruding radially outward from a rear end of the shaft. Two locking portions are provided on a peripheral edge of the flange. The sleeve includes a concave portion into which the flange enters from one side. Two locked portions are provided on an inner wall of the concave portion and are to be locked by the locking portions from the other side.

According to this configuration, the resin molded portion is molded integrally to the terminal contact portion and is provided with the insulating portion. Thus, the insulating portion can be formed by insert molding. Resin having a high heat resistance can be used for the insert molding so that the insulating portion can be held on the male terminal with a higher holding force than in the case where a rear end part of the shaft is deformed by thermal welding and the insulating portion is held on the male terminal as before. Additionally, the heat resistance of the resin molded portion can be improved. Further, plural resin molded portions can be formed at once by insert molding. Thus, a manufacturing time can be shortened To mount the sleeve on the male terminal, only a simple operation of inserting the flange of the resin molded portion into the concave portion of the sleeve from one side needs to be performed, and the sleeve can be held in a state mounted on the male terminal by locking the two locking portions to the two locked portions from the other side. Further, the male terminal itself need not be provided with the flange and the shape of the male terminal can be simplified. Therefore, the male terminal can be manufactured not by expensive cutting, but by inexpensive press working.

The male terminal may include a wire connecting portion to be connected to the wire. Additionally, the sleeve may include a front wall mounted on the flange, a rear wall mounted on an outer peripheral surface of the wire and two peripheral walls disposed on both sides of the wire connecting portion. The concave portion may be provided in the front wall portion. According to this configuration, the wire connecting portion is located between the peripheral walls. Thus, a shrinkable tube can be accommodated in a space enclosed by the front wall, the rear wall and the peripheral walls by mounting the shrinkable tube on the outer periphery of the wire connecting portion and mounting the sleeve on the wire connecting portion. In this way, the shrinkable tube can be shrunk while being positioned by the sleeve.

The connector may include a housing having a cavity configured to accommodate the male terminal and a front stop projecting from an inner wall of the cavity and configured such that the flange and the front wall come into contact therewith from behind, and a retainer configured to be mounted on the housing from behind and lock the rear wall portion from behind.

In this configuration, when the male terminal is inserted into the cavity from behind, the flange and the front wall contact the front stop from behind so that the male terminal is stopped in front and accommodated in the cavity. The retainer subsequently is mounted on the housing from behind and locks the rear wall of the sleeve from behind so that the sleeve is retained and the male terminal is retained by the sleeve.

According to the connector disclosed by this specification, it is possible to improve a holding force of the resin molded portion for holding the male terminal and to improve the heat resistance of the resin molded portion. Further, a manufacturing time can be shortened by forming the resin molded portions of a plurality of the male terminals at once by insert molding.

DETAILED DESCRIPTION

Figure 1:
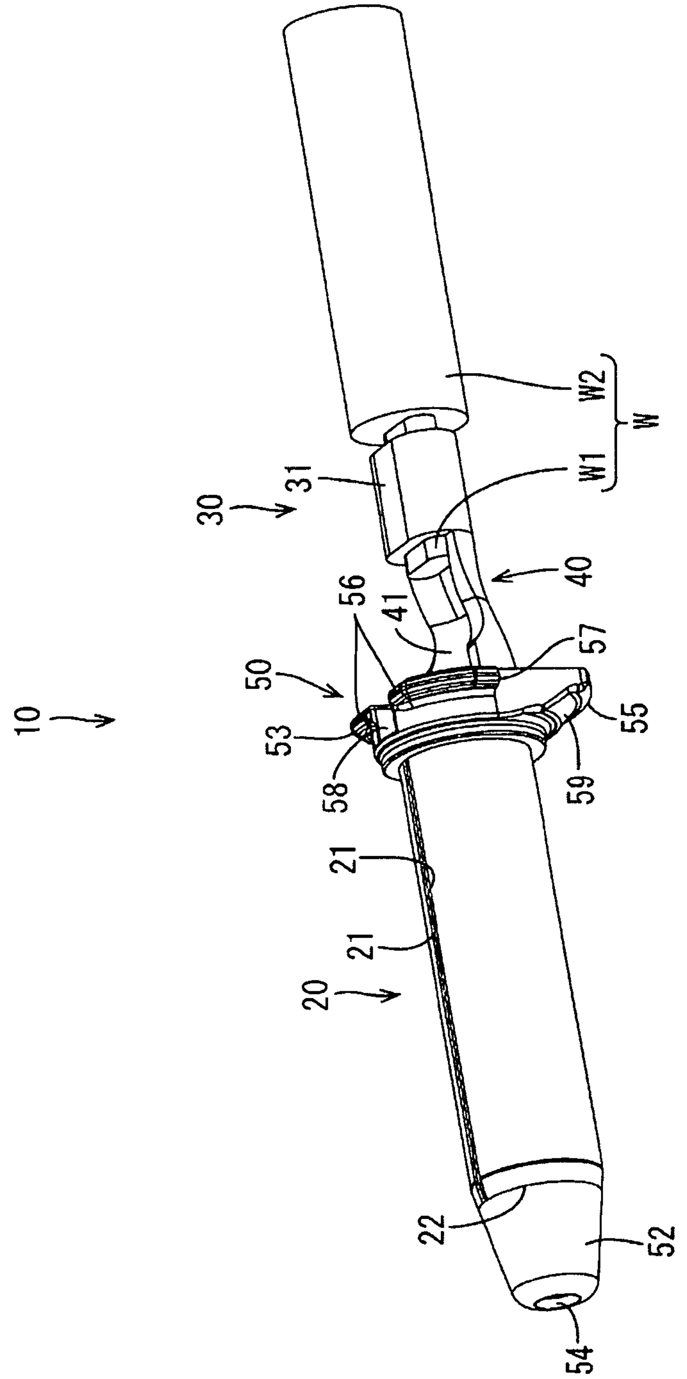
FIG. 1 is a perspective view of a male terminal.

An embodiment is described with reference to FIGS. 1 to 11. A male terminal 10 in this embodiment includes, as shown in FIG. 1, a terminal contact portion 20 to be connected to an unillustrated mating terminal, a wire connecting portion 30 connected to a core W1 of a wire W, and a linking portion 40 linking the terminal contact portion 20 and the wire connecting portion 30. The male terminal 10 is formed by press-working a conductive metal flat plate. In the following description, a front-rear direction is based on a lateral direction of FIG. 2 and a left side of FIG. 2 is referred to as a front.

Figure 2:
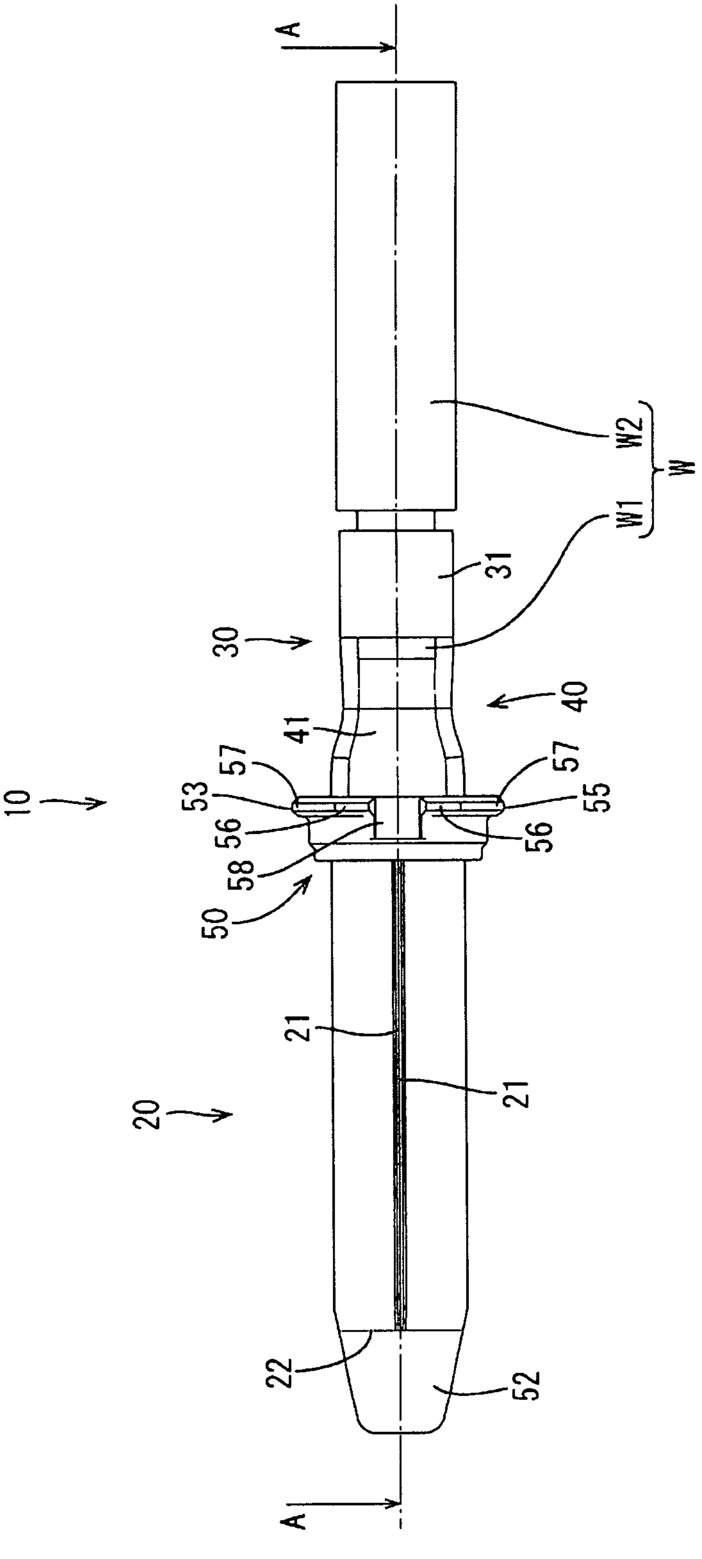
FIG. 2 is a plan view of the male terminal.
Figure 3:
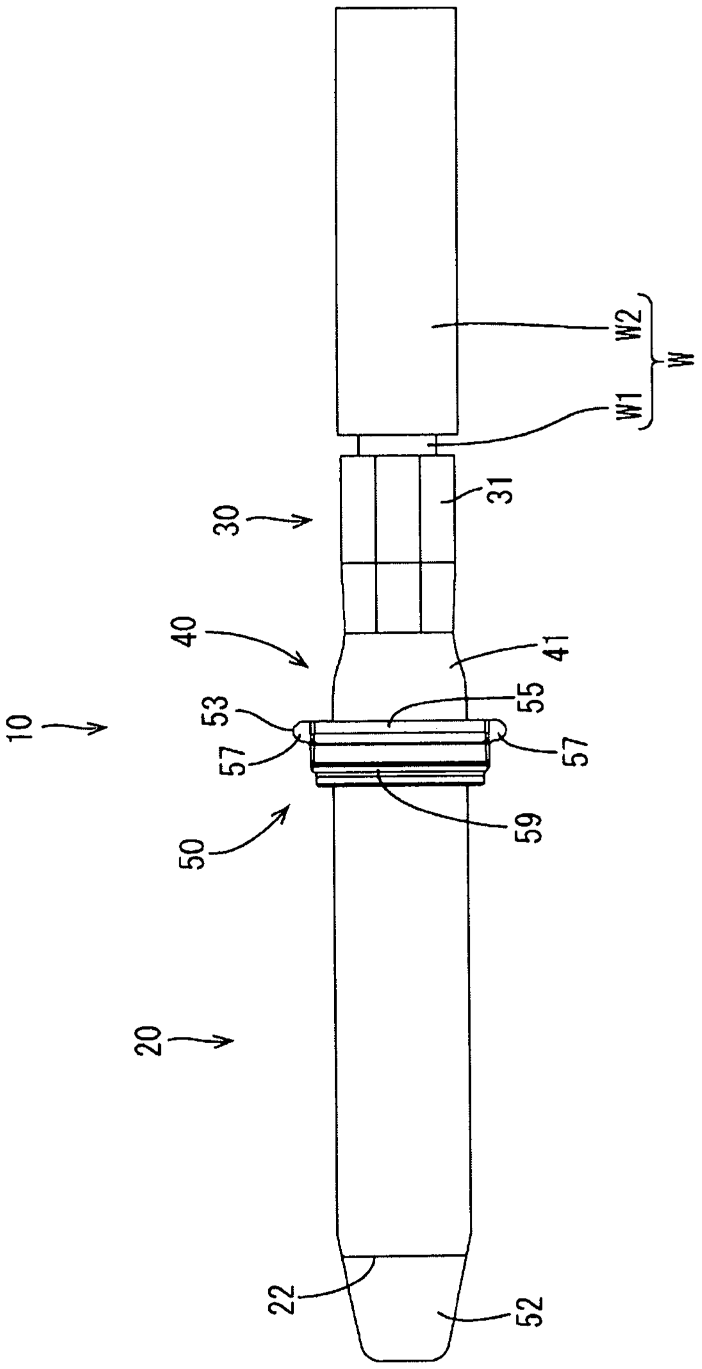
FIG. 3 is a bottom view of the male terminal.
Figure 4:
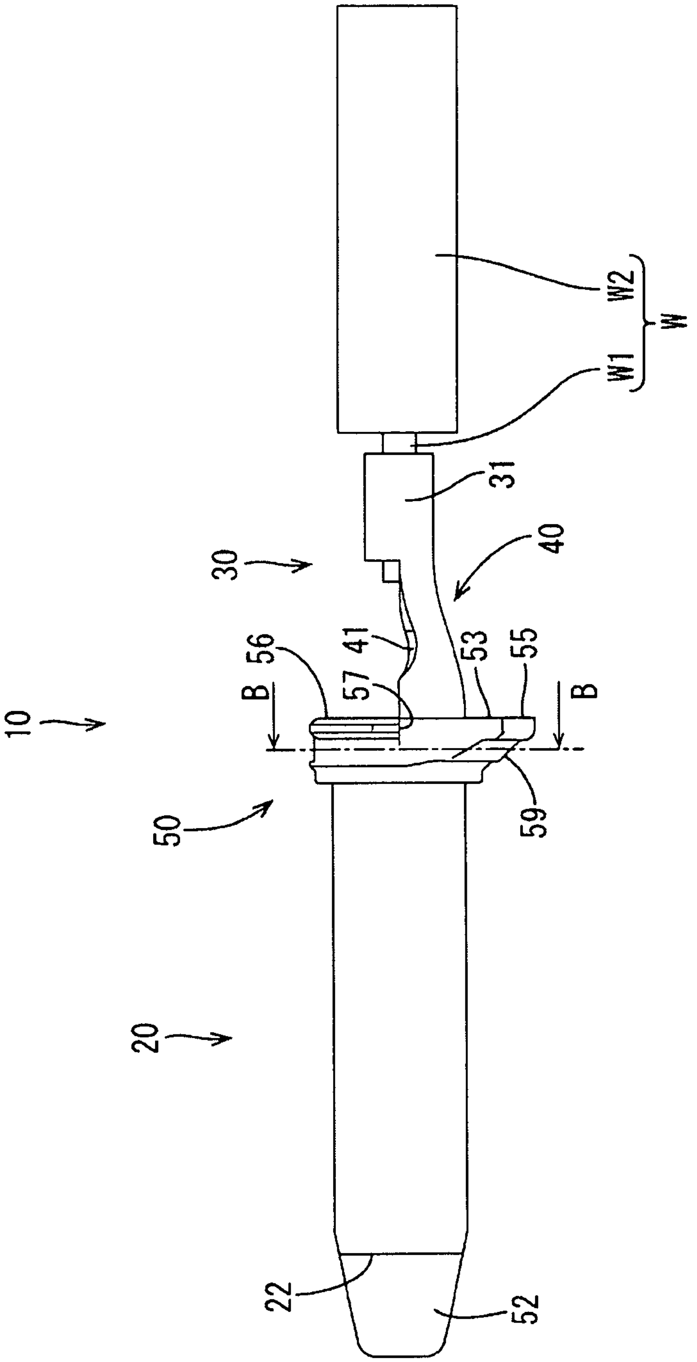
FIG. 4 is a side view of the male terminal.
Figure 5:
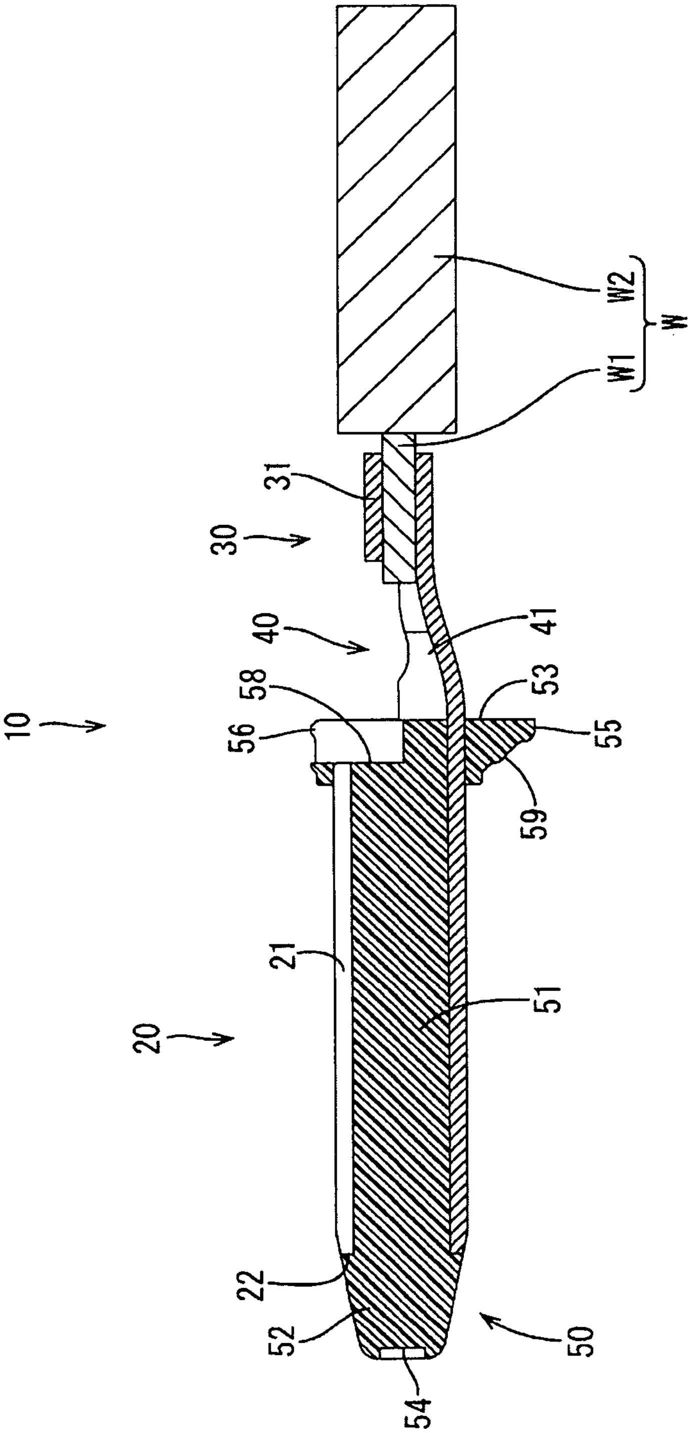
FIG. 5 is a section along A-A of FIG. 2.

The terminal contact portion 20 is a circular tube open in the front-rear direction, as shown in FIG. 5, and is formed by bending a metal flat plate into a circular tube shape by butting both side edges 21 of the metal flat plate against each other, as shown in FIG. 2. The terminal contact portion 20 is formed integrally with a resin molded portion 50 by insert molding. On the other hand, the wire connecting portion 30 includes a barrel 31 in the form of an open or closed barrel, and the barrel 31 is crimped to the core W1. Further, the linking portion 40 has an arcuate cross-section open upward, as shown in FIG. 9, and includes a constricted portion 41 more reduced in diameter toward a rear side, as shown in FIG. 2

As shown in FIG. 5, the resin molded portion 50 includes a shaft 51 filled inside the terminal contact portion 20, an insulating portion 52 projecting forward from the front end (part enclosed by a front edge 22 of the terminal contact portion 20) of the shaft 51 and a flange 53 protruding radially outward from the rear end of the shaft 51. The shaft 51 is in the form of a solid rod, the insulating portion 52 has a tapered conical shape, and the shaft 51 and the insulating portion 52 are formed integrally. The insulating portion 52 is locked to the front edge 22 of the terminal contact portion 20 and is exposed to the outside of the terminal contact portion 20. A recess 54 is provided in the front surface of the insulating portion 52.

Figure 9:
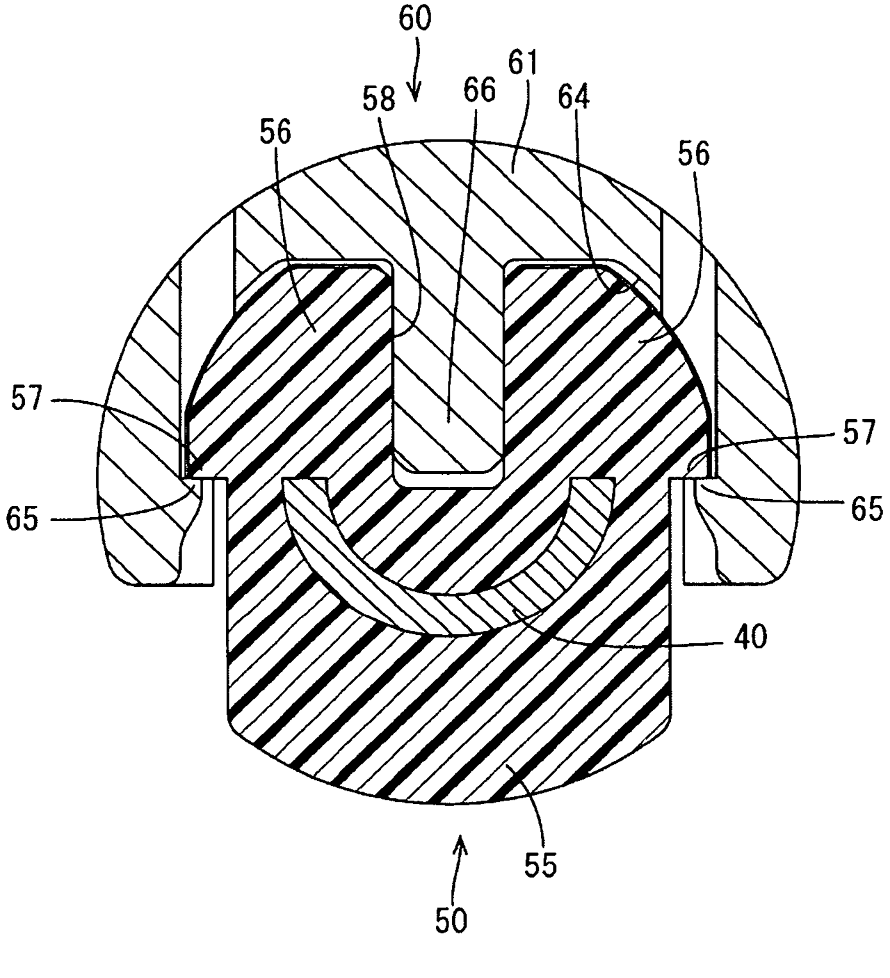
FIG. 9 is a section along C-C in FIG. 6.
Figure 10:
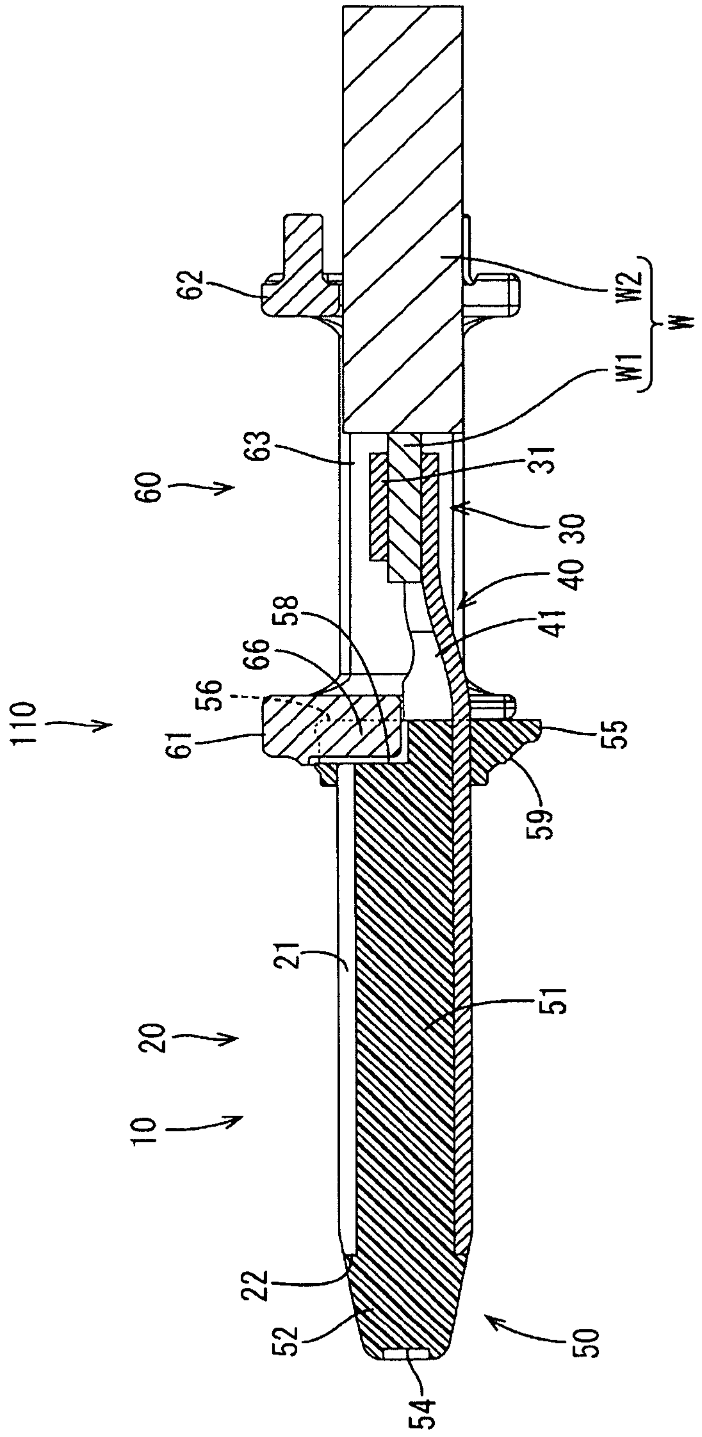
FIG. 10 is a section along D-D in FIG. 7.

As shown in FIG. 9, the flange 53 includes a lower flange portion 55 projecting down from the linking portion 40 and two upper flange portions 56 projecting up from the linking portion 40. The upper flange portions 56 are provided side by side in the lateral direction, and two linking portions 57 projecting in the lateral direction are provided on outer side edges of the upper flange portions 56. A groove 58 is formed between the upper flange portions 56. The linking portions 57 are provided respectively on side edges opposite to the groove 58. Note that the lower flange portion 55 has a stepped surface 59 stepped radially inwardly toward the front, as shown in FIG. 5.

Figure 6:
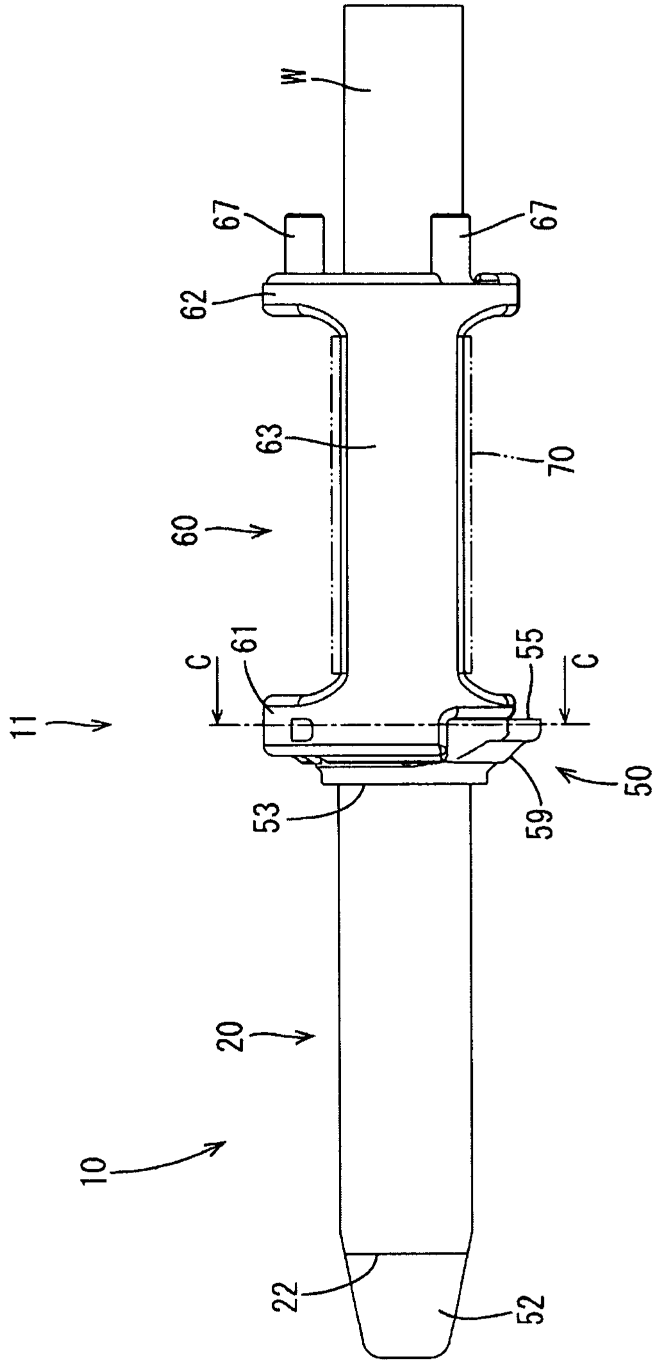
FIG. 6 is a side view of a male terminal with sleeve in which the male terminal is assembled with a sleeve.
Figure 7:
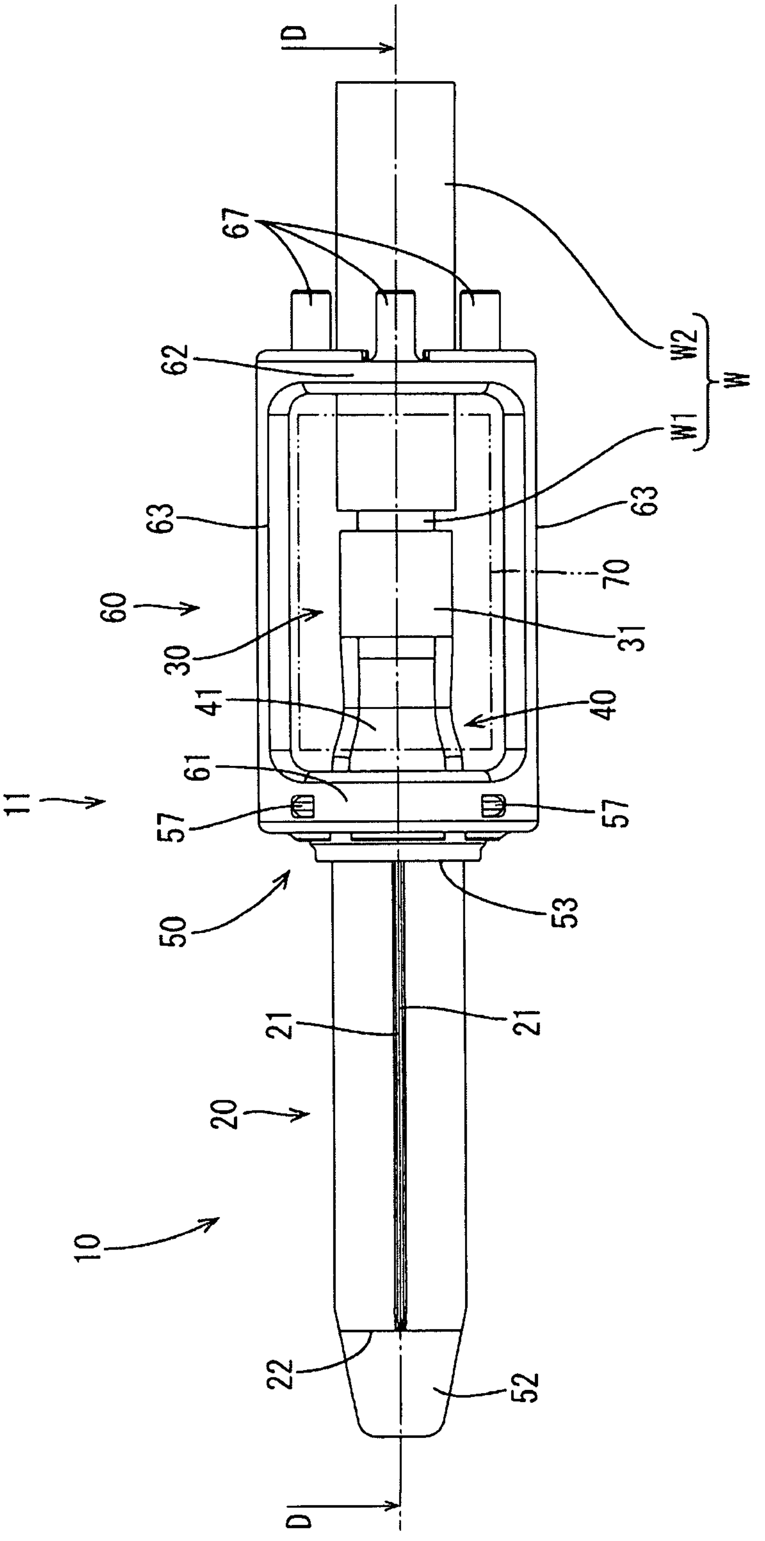
FIG. 7 is a plan view of the male terminal with sleeve in which the male terminal is assembled with the sleeve.
Figure 8:
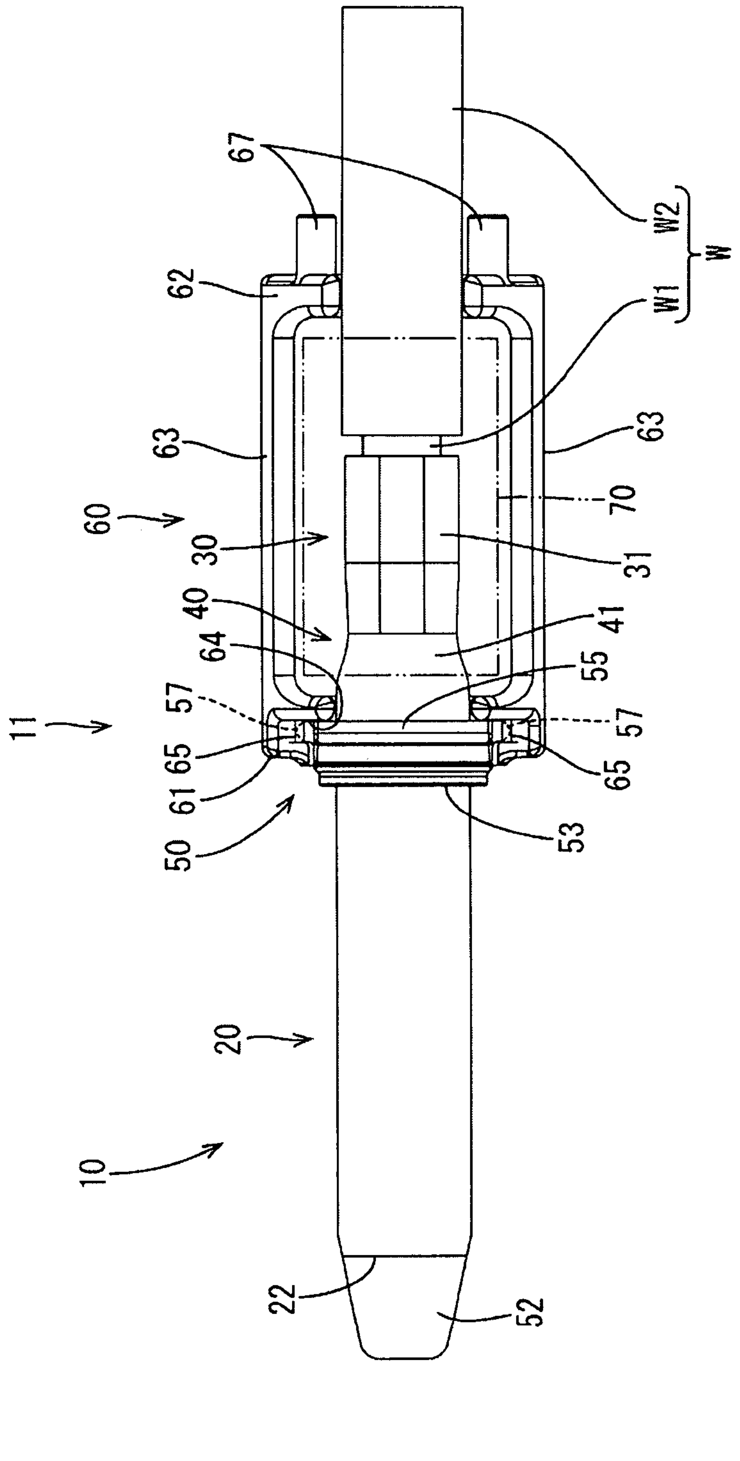
FIG. 8 is a bottom view of the male terminal with sleeve in which the male terminal is assembled with the sleeve.

As shown in FIG. 6, a sleeve 60 is mounted on the male terminal 10. In the following description, the male terminal 10 having the sleeve 60 mounted thereon is referred to as a male terminal with sleeve 11. The sleeve 60 is mounted from above the male terminal 10 to enclose the wire connecting portion 30. As shown in FIG. 7, the sleeve 60 is in the form of a rectangular frame when viewed from above. A shrinkable tube 70 is mounted inside the sleeve 60.

The sleeve 60 includes a front wall 61 mounted on the flange 53 of the male terminal 10, a rear wall 62 mounted on the outer peripheral surface of an insulation coating W2 of the wire W, and two peripheral walls 63 disposed on both sides of the wire connecting portion 30 and coupling the front wall 61 and the rear wall 62. As shown in FIG. 9, the front wall 61 includes a concave portion 64 into which the flange 53 enters from below. Locked portions 65 are provided on both left and right sides of the inner wall of the concave portion 64. The locking portions 57 are locked to the locked portions 65 from above.

According to this mechanism, if the shrinkable tube 70 is mounted on the outer periphery of the wire connecting portion 30 in advance and the sleeve 60 is mounted and fixed to the male terminal 10, the shrinkable tube 70 is accommodated inside the sleeve 60 and positioned in the front-rear direction. Thus, a positional deviation of the shrinkable tube 70 can be avoided when the shrinkable tube 70 is heated and shrunk.

Further, a guide 66 projects down on an upper side of the inner wall of the concave portion 64 and enters the groove 58 of the flange 53 from above. The entrance of the guide 66 into the groove 58 guides an assembling operation of the sleeve 60*s*, and the locking portions 57 are locked to the locked portions 65 to hold the sleeve 60 on the male terminal 10, thereby configuring the male terminal with sleeve 11. As shown in FIG. 7, projections 67 project rearward on the rear wall 62 of the sleeve 60.

Figure 11:
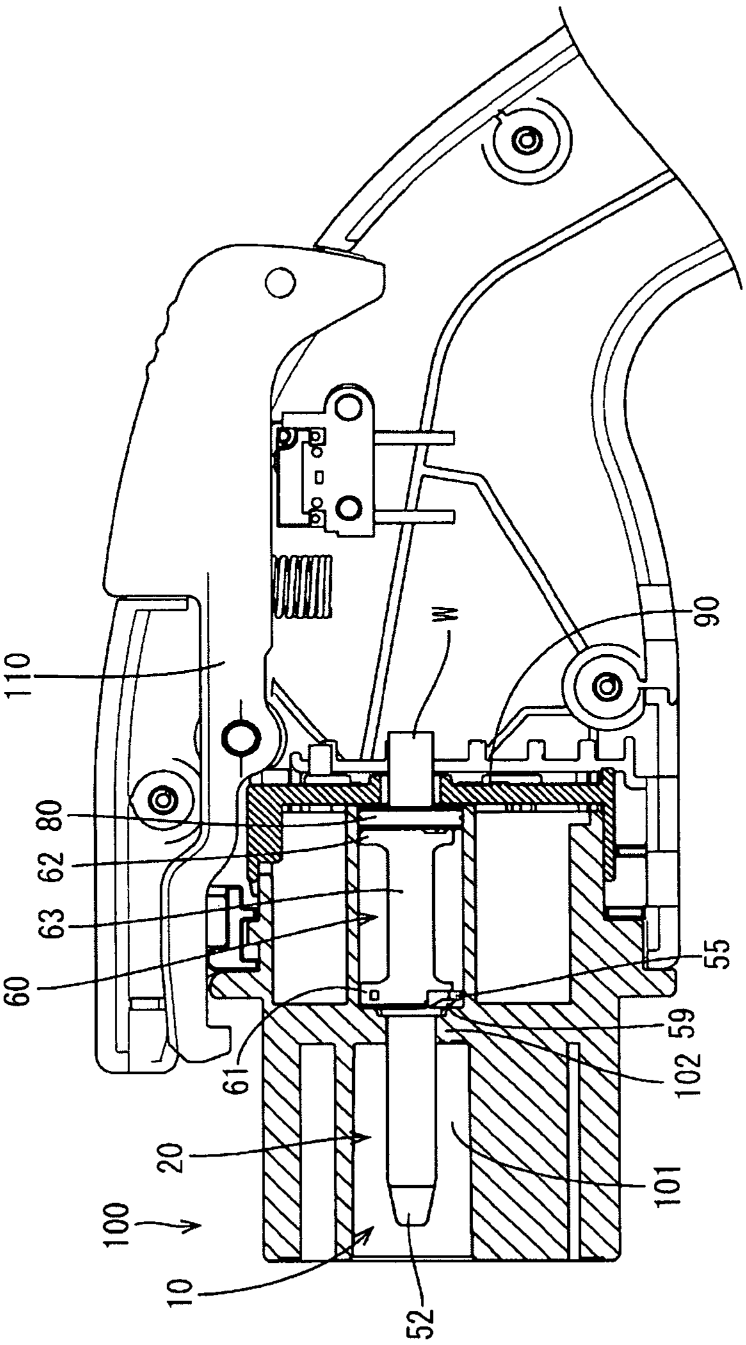
FIG. 11 is a side view showing an internal structure of a charging connector.

As shown in FIG. 11, the male terminal 10 of this embodiment is used by being accommodated into a charging connector 12. The charging connector 12 includes the male terminal with sleeve 11, a housing 100, a retainer 90 and a lock lever 110. The housing has a cavity 101, and the male terminal with sleeve 11 is accommodated therein. The retainer 90 is mounted on the housing 100 from behind, and the lock lever 110 is lockable to a lock portion on an unillustrated vehicle-side connector. When the charging connector 12 is connected to the vehicle-side connector, the male terminal 10 is fit and conductively connected to an unillustrated female terminal, and the lock lever 110 is locked to the lock portion of the vehicle-side connector to hold the charging connector 12 and the vehicle-side connector in a connected state.

A rubber plug 80 is mounted on the rear end of the sleeve 60 and has through holes (not shown) into which the projections 67 are inserted. Further, the retainer 90 is mounted behind the rubber plug 80. The retainer 90 is mounted on the housing 100 having the male terminal with sleeve 11 accommodated therein from behind and is held thereon. The respective projections 67 of the sleeve 60 are inserted through the through holes of the rubber plug 80 and are held in contact with the retainer 90. Thus, the sleeve 60 is retained by the retainer 90 and the male terminal 10 is retained by the sleeve 60.

A front stop 102 projects radially inward from the inner wall of the cavity 101. The front stop 102 is provided with a through hole for allowing the terminal contact portion 20 of the male terminal 10 to be inserted therethrough. When the male terminal with sleeve 11 is inserted into the cavity 101 from behind, the terminal contact portion 20 is inserted through the through hole of the front stop 102 and the stepped surface 59 of the resin molded portion 50 and the front wall 61 of the sleeve 60 come into contact with the front stop 102 from behind. As a result, the male terminal with sleeve 11 is stopped in front.

If the terminal contact portion 20 is inserted in an oblique posture into the through hole of the front stop 102, the stepped surface 59 interferes with the front stop 102. Even in such a case, the terminal contact portion 20 can be guided forward by causing the stepped surface 59 to slide along a hole edge of the front stop 102, and the male terminal with sleeve 11 can be guided to a proper insertion position.

As described above, the resin molded portion 50 integrally molded to the terminal contact portion 20 is provided with the insulating portion 52. Thus, the insulating portion 52 can be formed by insert molding. Resin having a high heat resistance can be used for insert molding. Accordingly, the insulating portion 52 can be held on the male terminal 10 with a higher holding force than in the case where a rear end part of the shaft 51 is deformed by thermal welding and the insulating portion is held on the male terminal. Therefore, the heat resistance of the resin molded portion 50 can be improved. Further, since a plurality of the resin molded portions 50 can be formed at once by insert molding, a manufacturing time can be shortened.

To mount the sleeve 60 on the male terminal 10, only a simple operation of inserting the flange 53 of the resin molded portion 50 into the concave portion 64 of the sleeve 60 from one side needs to be performed, and the sleeve 60 can be held in a state mounted on the male terminal 10 by locking the locking portions 57 to the locked portions 65 from the other side. Further, the male terminal 10 itself need not be provided with the flange 53 and the shape of the male terminal 10 can be. Therefore, the male terminal 10 can be manufactured not by expensive cutting, but by inexpensive press working.

The male terminal 10 may include: the wire connecting portion 30 to be connected to the wire W. The sleeve 60 may include: the front wall 61 mounted on the flange 53; the rear wall 62 mounted on the outer peripheral surface of the wire W and the two peripheral walls 63 disposed on both sides of the wire connecting portion 30. Additionally, the concave portion 64 may be provided in the front wall 61. According to this configuration, the wire connecting portion 30 is located between the two peripheral walls 63. Thus, the shrinkable tube 70 can be accommodated in a space enclosed by the front wall 61, the rear wall portion 62 and the two peripheral walls 63 by mounting the shrinkable tube 70 on the outer periphery of the wire connecting portion 30 and mounting the sleeve 60 on the wire connecting portion 30. In this way, the shrinkable tube 70 can be shrunk while being positioned by the sleeve 60.

There may be provided the housing 100 including the cavity 101 configured to accommodate the male terminal 10 and the front stop 102 projecting from the inner wall of the cavity 101 and configured such that the flange 53 and the front wall 61 come into contact therewith from behind. The retainer 90 is mounted on the housing 100 from behind and is configured to lock the rear wall 62 from behind.

In this configuration, when the male terminal 10 is inserted into the cavity 101 from behind, the flange 53 and the front wall 61 contact the front stop 102 from behind so that the male terminal 10 is stopped in front and accommodated in the cavity 101. The retainer 90 subsequently is mounted on the housing 100 from behind and locks the rear wall portion 62 of the sleeve 60 from behind so that the sleeve 60 is retained and the male terminal 10 is retained by the sleeve 60.

The invention is not limited to the above described and illustrated embodiment. For example, the following various modes are also included.

Although the flange 53 is illustrated to enter the concave portion 64 of the sleeve 60 from below in the above embodiment. However, an entrance direction of the flange 53 into the concave portion 53 may be an upward or lateral direction instead of a downward direction.

Although the concave portion 64 is provided in the front wall 61 in the above embodiment, a concave portion only has to be provided in the sleeve 60 and may be provided between the front wall 61 and the rear wall 62.

Although the retainer 90 contact the projections 67 provided on the rear wall 62 in the above embodiment, the retainer 90 may directly contact the rear surface of the rear wall 62 if the rubber plug 80 is not mounted on the rear surface of the rear wall 62. In such a case, a rubber ring may be mounted on the peripheral surface of the rear wall 62.

LIST OF REFERENCE SIGNS

10 . . . male terminal
12 . . . charging connector
20 . . . wire connecting portion
30 . . . wire connecting portion
50 . . . resin molded portion
51 . . . shaft
52 . . . insulating portion
53 . . . flange
55 . . . lower flange portion
56 . . . upper flange portion
57 . . . locking portion
60 . . . sleeve
61 . . . front wall
62 . . . rear wall
63 . . . peripheral wall
64 . . . concave portion
65 . . . locked portion
90 . . . retainer
100 . . . housing
101 . . . cavity
102 . . . front stop
W . . . wire
W1 . . . core

The invention claimed is:

1. A connector, comprising:

a male terminal including a terminal contact portion having a hollow tubular shape and open in a front-rear direction;

a resin molded portion integrally molded to the terminal contact portion;

a wire pulled out rearward from the male terminal; and a sleeve mounted to cover a core exposed in a front end part of the wire;

wherein:

the resin molded portion includes a shaft filled inside the terminal contact portion, an insulating portion projecting forward from a front end of the shaft and a flange protruding radially outward from a rear end of the shaft and two locking portions are provided on a peripheral edge of the flange; and the sleeve includes a concave portion into which the flange enters from a first side, and two locked portions to be locked by the two locking portions from a second side are provided on an inner wall of the concave portion.

2. The connector of claim 1, wherein:

the male terminal includes a wire connecting portion to be connected to the wire; and the sleeve includes a front wall mounted on the flange, a rear wall mounted on an outer peripheral surface of the wire and two peripheral wall disposed on both sides of the wire connecting portion, and the concave portion is provided in the front wall.

3. The connector of claim 2, comprising:

a housing including a cavity configured to accommodate the male terminal and a front stop projecting from an inner wall of the cavity and configured such that the flange and the front wall come into contact therewith from behind; and a retainer configured to be mounted on the housing from behind and lock the rear wall from behind.

* * * * *